United States Patent [19]

Gilmour

[11] Patent Number: 4,567,121

[45] Date of Patent: Jan. 28, 1986

[54] INSULATING SEAL FOR ELECTROCHEMICAL CELLS

[75] Inventor: Alexander Gilmour, Henley-On-Thames, England

[73] Assignee: Venture Technology Limited, Oxfordshire, England

[21] Appl. No.: 741,595

[22] Filed: Jun. 5, 1985

[30] Foreign Application Priority Data

Jun. 8, 1984 [GB] United Kingdom ............... 8414613

[51] Int. Cl.$^4$ .......................................... H01M 2/02
[52] U.S. Cl. .................................. 429/181; 429/185; 29/623.2; 29/623.4
[58] Field of Search ............... 429/185, 181; 29/623.2, 29/623.4, 623.5

[56] References Cited

U.S. PATENT DOCUMENTS 4,419,418  12/1983  Knodler et al. ............... 429/185 X
4,508,797  4/1985   Knoedler et al. ............... 429/181 X Primary Examiner—Charles F. LeFevour
Attorney, Agent, or Firm—Birch, Stewart, Kolasch & Birch

[57] ABSTRACT

An electrochemical cell (2) including at least two electrically conductive parts (8,14) which are sealed together by an organic polymer adhesive (16) but electrically insulated from each other by a layer (10) comprising aluminum oxide which is formed on a surface of one of the parts.

14 Claims, 5 Drawing Figures

INSULATING SEAL FOR ELECTROCHEMICAL CELLS

FIELD OF THE INVENTION

The present invention relates to a method of sealing electrochemical cells and to electrochemical cells sealed by such a method. In particular, the present invention relates to insulating electrically the positive and negative electrode assemblies of sealed electrochemical cells.

Because of the outstanding market demand for small hermetically sealed batteries, mass production of the unit cells, particularly those which use a lithium negative electrode, is commercially of great interest. The long shelf life that has now been well established for certain lithium-based systems is achieved only when the cells are hermetically sealed since lithium metal will readily react with water vapour, carbon dioxide etc., if the atmosphere is not excluded from the interior of the cell.

Insulation between the two terminals is essential in modern electrochemical cells and it is of paramount importance that there is no chemical or electrochemical attack on the insulator by the active constituents of the cell and in particular by a liquid electrolyte or depolariser. In conventional round cells the insulating gasket is commonly constructed using a thermoplastic resin such as nylon, polypropylene etc., and can be in the form of a disc or L-shaped ring formed by injection moulding. A seal is achieved by crimping such a member between a metal can and a metal top, these constituting the electrode terminals. Such a method is not practicable for smaller cells because of the relatively large volume required for the seal.

A quite different approach to an electrically insulative seal is to use a glass to metal feedthrough arrangement for applications where the electrochemical cell may be subjected to high temperatures and pressures. Such a system has been used in lithium cells which use a liquid depolariser such as sulphur dioxide or thionyl chloride. Glass to metal seals are particularly suitable for the larger cylindrical cells where there is adequate depth to accommodate the feedthrough but for very thin cell configurations they are entirely unsuitable since they are too thick and are liable to crack when bent or twisted.

Another disadvantage of the use of glass in lithium battery systems where lithium ions are in solution in the electrolyte lies in the susceptibility of many glasses to ion exchange with lithium and the subsequent ion reduction to yield metallic conduction across the insulator gap.

DESCRIPTION OF THE PRIOR ART

In our British Patent Application No. 8136650 the use of thermoplastic bonding materials based on copolymers of ethylene and ionomer resins is described and the required insulation is provided by an insulation medium which is an interlayer of material having a melting point higher than that of the bonding material, a preferred material being a thin glass fibre cloth. The method can employ a number of suitable materials and can be used in a wide range of cell configurations but has limitations in ultra thin or very small cells because of difficulties in the processing and handling of a discrete thin insulating layer.

SUMMARY OF THE INVENTION

Thus there is a need for a method of sealing together electrically conductive parts of an electrochemical cell such that the resultant seal is thin but provides the required high degree of electrical insulation between the parts and a strong mechanical bond between the parts so as to keep the electrochemical cell hermetically sealed.

The present invention provides an electrochemical cell including at least two electrically conductive parts which are sealed together by an organic polymer adhesive but electrically insulated from each other by a layer comprising aluminium oxide which is formed on a surface of one of the parts.

The present invention further provides a method of sealing together electrically conductive parts of an electrochemical cell while retaining the said parts electrically insulated from each other, the method comprising the steps of forming a layer comprising aluminium oxide on a surface of one of the parts and adhering the parts together by an organic polymer adhesive so that the layer electrically insulates the parts from each other.

Preferably, the said one of the parts is composed of aluminium or an aluminium alloy and the aluminium oxide is formed by oxidation of the surface of the said one part. The oxidation may be performed by any suitable known method e.g. by chemical means.

More preferably, however, the aluminium oxide layer is formed by an anodising process.

Preferably, the aluminium oxide layer has a thickness of from 0.1 micron to 25 microns, still more preferably from 1 micron to 25 microns, with the most preferable thickness ranging from 2 microns to 10 microns.

Preferably, the organic polymer adhesive is a hot melt adhesive, i.e. a thermoplastic bonding material, but thermosettable resins, typically epoxy resins and polyurethane resins, may also be used.

The thermoplastic bonding material may be any thermal bonding agent giving a sufficiently strong bond to the other cell components in use. It should also be as impermeable as possible to the internal constituents of the cell and vapours therefrom and to atmospheric gases and vapours. Furthermore, it should be inert to chemical attack by the internal constituents of the cell.

Examples of particularly suitable thermoplastic bonding materials are ionomer resins such as the polymer sold under the name "Surlyn" (sold by DuPont); copolymers of ethylene and acrylic acid; and terpolymers of ethylene, acrylic acid and an acrylic ester such as the polymer sold under the name "PRIMACORE" by Dow Chemical Co., and "Kuroplast" by BASF. Preferred copolymers of ethylene and acrylic acid contain up to 15% by weight acrylic acid—a particularly preferred copolymer of this type is sold by Dow Chemical Co. as Primacore and contains 8% by weight acrylic acid. A further particularly preferred material is a copolymer of ethylene and vinyl acetate, such as that sold under the name ELVAX-II by DuPont.

BRIEF DESCRIPTION OF THE DRAWINGS

Embodiments of the present invention will now be described by way of example only with reference to the accompanying drawings, in which.

DESCRIPTION OF THE PREFERRED EMBODIMENTS

Figure 1:
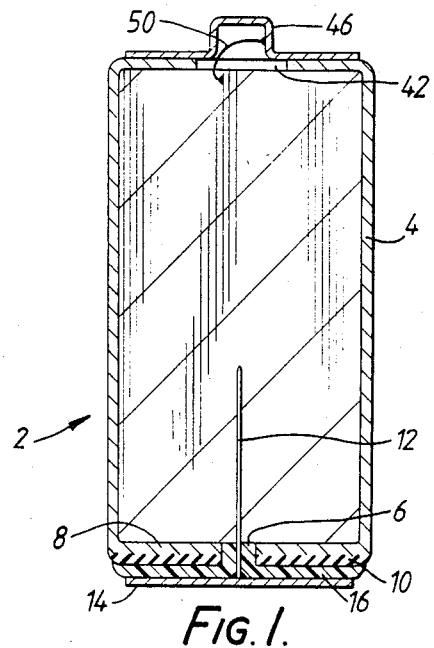
FIG. 1 is a side elevation, shown in section, of an electrochemical cell sealed in accordance with the present invention.

A first embodiment of the invention is shown in FIG. 1. A cylindrical electrochemical cell 2 includes a cylindrical can 4 which has a central aperture 6 in its base 8 and is formed from aluminium or an aluminium alloy. The base 8 of the can 4 is anodised on its outer surface to provide an anodised oxide layer 10 which has a thickness of from 0.1 microns to 25 microns, preferably from 1 micron to 25 microns and is more preferably around 10 microns. A layer 16 of a thermoplastic bonding material is coated on the anodised oxide layer 10. A stainless steel pin 12 is attached, e.g. by welding, to a metal disc 14 which is preferably also composed of stainless steel. Pin 12 is passed through aperture 6 in the base 8 until the inner surface of the metal disc 14 is disposed against the layer 16 of thermoplastic bonding material. The hermetic seal is obtained by heating the metal disc 14/base 8 combination to around 200° C. under a clamping pressure of around 10 bars (150 p.s.i.) in order melt and adhere the bonding material layer 16 to the base 8 of the can 4 and disc 14. The softened bonding material tends to flow during the heat sealing into aperture 6 so as to ensure that pin 12 and base 14 are electrically insulated from each other by the bonding material therebetween. To effect the sealing operation the cell may be heated by any suitable means, e.g. by an induction coil or by a heated pressure pad.

Figure 2:
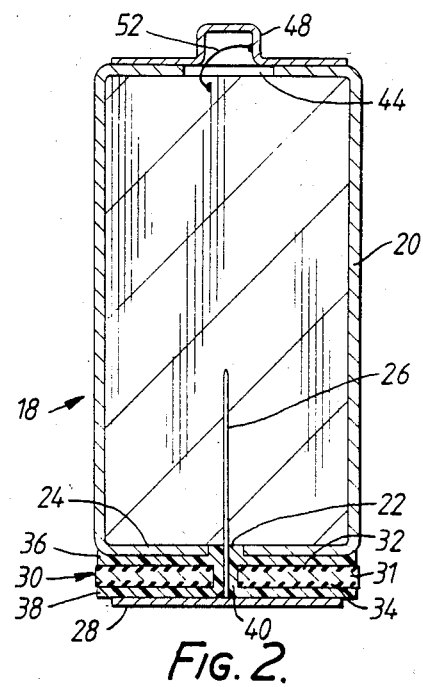
FIG. 2 is an elevation similar to FIG. 1, of an alternative embodiment of an electrochemical cell sealed in accordance with the present invention.

A second embodiment of the invention is shown in FIG. 2 which shows a cylindrical electrochemical cell 18 including a cylindrical can 20 having a central aperture 22 in its base 24 which is formed from a metal, preferably aluminium. One electrode of the cell takes the form of a pin 26 which is preferably formed from stainless steel. The pin 26 is attached, e.g. by welding, to a metal disc 28 which is preferably formed from nickel plated steel and which has a radius smaller than that of the can 20. A disc-shaped washer 30 is disposed between base 24 and metal disc 28, with pin 26 passing through the middle of washer 30. Washer 30 electrically insulates base 24 and metal disc 28 from each other. Washer 30 is composed of aluminium foil 31 which has been anodised on both sides to form oxide layers 32,34, each of which has a thickness of from 0.1 microns to 25 microns, preferably from 1 micron to 25 microns and is preferably around 10 microns. Each oxide layer 32,34 is coated by a thermoplastic bonding material to form bonding material layers 36,38 respectively. The aluminium foil 31 preferably has a thickness of from 0.1 mm to 0.2 mm. The washer 30 has a diameter slightly greater than that of the metal disc 28 so that the insulation between the metal disc 28 and the can 20 is maintained around the circumference of the metal disc 28. A hole 40 in the centre of the washer 30 is aligned with aperture 22 in the base of the can 20. The pin 26 is passed in turn through the hole 40 in the washer 30 and the aperture 22 in the base 24 of the can 20. A hermetic seal is obtained by heating the base 24 of the can 20, the washer 30 and the metal disc 28/pin 26 arrangement to around 200° C. under a clamping pressure of around 10 bars (150 p.s.i.) in order to melt and adhere the bonding material layers 36,38 to the base 24 of the can 20 and the metal disc 28 respectively. During the heat sealing some of the bonding material tends to flow into aperture 22 around the pin 26 so as to ensure that metal disc 28 and pin 26 are sealed to but electrically insulated from the base 24 of the can 20.

The invention described with reference to FIGS. 1 and 2 has particular application for lithium cells. In such cells, the electrochemical components may comprise a lithium foil anode and an $MnO_2$/graphite cathode which are preferably supported on metal mesh current collectors. A microporous polypropylene separator envelopes the lithium foil and the assembly of the two electrodes is wound into a spiral and is inserted into the can 4,20 through its open end 42,44 so that the lithium current collector is electrically connected to the pin 12,26. Electrolyte is added and a lid 46,48 composed of aluminium and having an inner layer of a hot melt adhesive laminated thereto is sealed on to the top surface of the can 4,20 by the application of heat. The lid 46,48 is connected to the cathode via a connecting wire 50,52.

Figure 3:
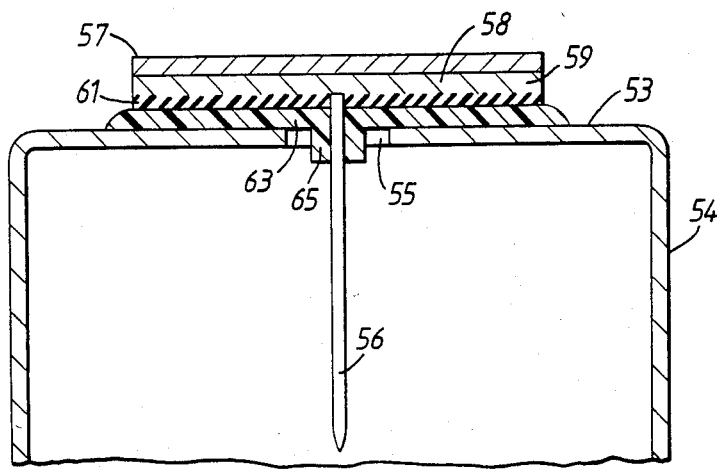
FIG. 3 is an elevation, similar to FIG. 1, of part of a further embodiment of an electrochemical cell prior to being sealed in accordance with the present invention.

Referring to FIG. 3, there is shown an end part of a further electrochemical cell prior to being sealed in accordance with another embodiment of the invention. For the sake of clarity of illustration, the electrochemical components are not shown. The base 53 of the can 54 has the aperture 55 therein through which pin 56 is passed. Pin 56 is preferably composed of stainless steel and in a lithium cell is connected to the lithium anode. Can 54 is composed of metal, preferably aluminium, and is connected to the cathode. The end of pin 56 is attached, preferably by welding, to the metal disc 57 which constitutes the anode contact for the cell. Metal disc 57 is of a laminar structure and consists of an outer layer 58 of a metal which is suitable as an electrical contact, e.g. nickel or nickel plated steel, and an inner layer 59 of aluminium. The aluminium layer 59 has an anodised oxide layer 61 thereon which is applied to the aluminium layer 59 in a manner similar to that used in the cells of FIGS. 1 and 2. Preferably, the anodised oxide layer 61 has a thickness of from 2 to 10 microns. The two layers 58,59 of the metal disc 57 may be joined by any suitable method, e.g. by explosive bonding the two layers together or electroplating one layer onto the other. A disc 63 of thermoplastic bonding material e.g. SURLYN is disposed over the anodised oxide layer 61 and around pin 56. The disc 63 of bonding material has an integral cylinder collar 65 which surrounds the pin 56 and extends through the aperture 55 in the base 53 of the can 54.

A two layer structure for the metal disc 57, provides an inner aluminium layer 59 which is required to allow formation of the anodised oxide layer 61 and an outer layer 58 which is of a metal which does not corrode over periods of time in adverse environments and is suitable for making electrical contacts. In the cells with which the present invention is concerned, the aluminium layer tends not to form a sufficiently good electrical contact and that is why it is covered with an appropriate metal layer which does not corrode and can form a satisfactory electrical contact.

To assemble the cell, the electrochemical components are placed in the can 54 and the base 53 is formed in known manner by turning over the side wall of the can 54 to form the annular base 53. The disc 63 and collar 65 assembly is passed over pin 56 so that the disc 53 is disposed against the anodised oxide layer 61. The collar 65 has an inner diameter which is substantially the same as the outer diameter of pin 56 and an outer diameter which is less than the diameter of aperture 55 in base 53 of the can 54. When the pin 56 is passed through aperture 55 the collar 65 also passes into aperture 55 and centralises the position of pin 56 in aperture 55.

Such centralisation ensures that pin 56 does not come into contact with base 53 surrounding aperture 55 which would lead to an electrical short between can 54 and metal disc 57. During heat sealing, the collar 65 melts and tends to flow so as to fill the aperture 55, thereby maintaining the required electrical insulation between can 54 and metal disc 57. The collar 65 is of any appropriate length such that it can extend into aperture 55 and is typically a few millimetres in length.

The anodised oxide layer 61 ensures that the can 54 and metal disc 57 are electrically insulated from each other. The bonding material seals the metal disc 57 and can 54 together and ensures that the cell is leak-proof.

In the embodiment of FIG. 3, when the cell is a lithium cell the anodised oxide layer ensures that there is substantially no chance of the lithium which is in the cell from coming directly into contact with exposed aluminium metal. If that happened, the lithium and aluminium would alloy together and the performance of the cell would be greatly reduced. Preferably, the pin 56 is welded directly to the nickel or nickel plated steel layer 58 through the aluminium layer 59, since it is difficult to weld aluminium, and then the aluminium layer 59 is anodised to form the anodised oxide layer 61. Alternatively, the pin 56 can be welded directly on to the nickel layer 58 after the aluminium oxide layer 59 has been locally removed, for example by abrasion.

When heat sealing is used in the preferred embodiments of the invention, the heat sealing method may be used for cells of any electrochemical system which is designed to operate at a temperature below the softening point of the bonding material. However, the combination of the insulation method and the sealing technique is particularly suitable for use with lithium organic electrolyte cells, two further embodiments of which are shown in FIGS. 4 and 5.

Figure 4:
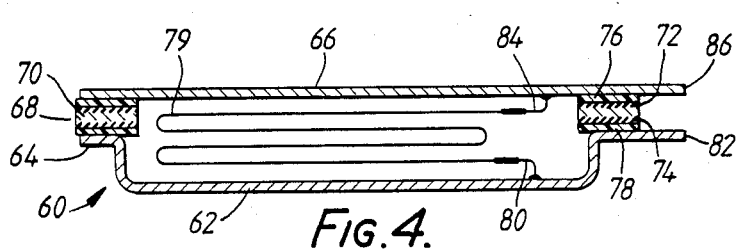
FIG. 4 is an elevation, shown in section, of a further embodiment of a cell which is sealed in accordance with the present invention.
Figure 5:
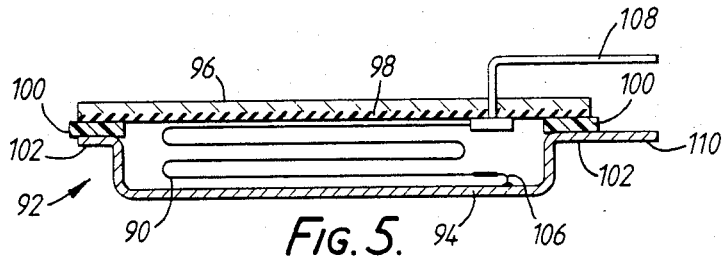
FIG. 5 is an elevation, shown in section, of a still further embodiment of a cell which is sealed in accordance with the present invention.

In the further embodiment of an electrochemical cell which is shown in FIG. 4, a cell casing 60 is formed from a tray-like base 62 having a peripheral rim 64 and into which base 62 the electrochemical components of the cell are placed. The cell is then closed by sealing to the base 62 a flat cover 66.

The peripheral rim 64 of the base 62 and the cover 66 are sealed together via a washer 68 which has substantially the same plan dimensions as that of the peripheral rim 64. The washer 68 consists of a thin foil 70 of aluminium or aluminium alloy which has been anodised on both sides so as to give anodised oxide layers 72,74 similar to those used in the cells of FIGS. 1 and 2. Each oxide layer 72,74 is coated with a layer 76,78 of thermoplastic bonding material which is heat sealable and similar to the type described above in connection with the cells of FIGS. 1, 2 and 3. Each oxide layer 72,74 has a thickness of from 0.1 microns to 25 microns, preferably from 1 micron to 25 microns and is more preferably around 10 microns. In order to seal the cell, the electrochemical components are placed in the base 62, the washer 68 is placed over the peripheral rim 64 and the cover 66 is then placed over the washer 68. The edges of the cell are then heat sealed thereby to melt the thermoplastic bonding material layers 76,78 and seal hermetically the edges of the cell, formed by the rim 64/washer 68/cover 66 composite, with an electrically insulative seal.

For a typical lithium cell, the lithium anode takes the form of a strip of extruded foil which is surrounded by a microporous polypropylene separator. The separator is laid alongside the cathode, which is typically a $MnO_2$/graphite composition which is pasted on to a stainless steel mesh. The combined "sandwich" 79 is folded as shown in FIG. 4. The electrolyte is preferably lithium perchlorate dissolved in a mixture of propylene carbonate and dimethoxyethane and is added to the folded sandwich 79 inside the cell. The cathode is electrically connected to the base 62 via a connecting strip 80 and the peripheral rim 64 of the base 62 is provided with a tab 82 which acts as a terminal for the cell. The lithium anode is electrically connected to the cover 66 via a further connecting strip 84 and the cover 66 has a tab 86 which acts as the other terminal for the cell.

The thickness of the washer 68 is shown greatly out of proportion for the sake of clarity. In fact, the washer 68 may be made very thin, with the aluminium foil 70 having a preferred thickness of from 0.1 to 0.2 mm. Advantages of the cell of FIG. 4 and the low cost of mass production of the washer 68 for the seal. Futhermore, any suitable metals, e.g. aluminium, copper, stainless steel, may be used for the cover 66 and the base 62 and there is no requirement for either the cover 66 or the base 62 to be composed of aluminium or an aluminium alloy.

A further embodiment of the invention is shown in FIG. 5 in which there is shown a cell casing 92 which contains the electrochemical components of the cell including a sandwich 90 which is similar to that employed in the embodiment of FIG. 4. The cell casing 2 is formed from a tray-like base 94 into which the electrochemical components of the cell are placed and which is then closed by sealing to it a flat cover 96.

The cover 96 is made from a sheet of aluminium or aluminium alloy which has been anodised on one side thereof so that the inner surface of the cover 96 is coated with an anodised oxide layer 98. If desired, the cover 96 may comprise a bimetal sheet similar to that employed in the embodiment of FIG. 3. For example, cover 96 may be a nickel/aluminium bimetal sheet, with the nickel layer constituting the top surface of the cell 92.

The base 94 is formed from a pressed sheet of metal. The preferred materials for the base 94 are aluminium or aluminium alloys, but other metals such as copper or stainless steel may be used.

The anodised layer 98 has a thickness ranging from 0.1 microns to 25 microns, preferably from 1 micron to 25 microns and more preferably from 2 microns to 10 microns.

The base 94 and cover 96 are sealed together by means of an adhesive layer 100. The edge of the cover 96 and a peripheral rim 102 of the base 94 are adhered together to form the seal. Preferably, the adhesive is a hot melt adhesive. In particular, the adhesive layer 100 is preferably formed from a sheet of a thermoplastic bonding material of the type described hereinabove.

The bonding material may be prelaminated to the anodised oxide layer 98 or to the conductive metal surface of the peripheral rim 102 or to both of them. Alternatively, an unsupported film of the bonding material may be used.

In FIG. 5, the thicknesses of the anodised layer 98 and the adhesive layer 100 are shown greatly out of proportion for the sake of clarity.

In order to seal the cell 92, the electrochemical components of the cell are placed in the base 94 and the cover 96 having the anodised layer 98 is placed above the base 94 with the adhesive layer 100 or sheet of thermoplastic bonding material to form the adhesive layer 100 between the cover 96 and the base 94. When a thermoplastic bonding material is employed, a hermetic seal is obtained by heating the edge of the cover 96 and the peripheral rim 102 of the base 94 while they are clamped together under pressure. A preferred temperature is around 200° C. and a preferred pressure of 10 bars (150 p.s.i.) is applied during the heating cycle. The thermoplastic bonding material softens and seals the base 94 to the anodised layer 98 on the cover 96.

The cathode of the sandwich 90 is electrically connected to the base 94 by welding a connecting strip 106 between the cathode and the inside of the base 94. The lithium anode is connected to a terminal strip 108, which is preferably composed of stainless steel. The terminal strip 108 is adhesively bonded to the anodised layer 98 on the inside of the cover 96 and extends through a hole in the cover 96 and out of the cell in such a manner so as to ensure that the cell is still hermetically sealed. A tab 110 extends away from the peripheral rim 102 of the base 94 and acts as the other terminal for the cell. When a nickel/aluminium bimetal sheet is used for cover 96, the lithium anode can be electrically connected directly to the cover 96 and the nickel surface of the cover 96 can be used as the anode contact for the cell 92 or the terminal strip 108 can be connected directly to the nickel surface.

It will be appreciated that the terminal strip 108 and the base 94 each act as a respective terminal for the cell. The purpose of tab 110 is to facilitate electrical connection of the cell to other cells to form a battery.

When two or more cells are to be connected together to form a battery, it is preferable that cover 96 is anodised on both sides thereof so as to render the outer surface of cover 96 electrically insulative. With such an arrangement, when two covers 96 of respective cells are disposed adjacent each other, the required electrical insulation between the two covers 96 will be provided by the two outer anodised oxide layers.

Although the preferred embodiments described above relate to the sealing of electrochemical cells by employing a hot-melt adhesive, i.e. a thermoplastic bonding material, any other suitable form of organic polymer adhesive may be used, provided that it is capable of forming a hermetic seal for the electrochemical cell. A typical example of such other polymer adhesives is a crosslinked thermosetting system such as adhesive based on epoxy resins or polyurethanes.

Furthermore, the illustrated embodiments employ an anodised aluminium oxide layer as the layer of electrically insulating material to provide the required electrical insulation for the seal. However, any suitable electrically insulative aluminium oxide-containing layer may be employed and such a layer may be formed by methods other than anodising e.g. by chemical oxidation.

In the preferred embodiments, the use of an anodised aluminium oxide layer as the electrically insulative layer results in a number of advantages over the above-described known methods of sealing electrochemical cells. The anodised layer provides very good electrical insulation even though it is very thin being generally less than 15 microns. The thinness of the layer is very important in thin and micro-electrochemical cells for specialist applications where the cell is required to be as thin as possible. The anodised layer is very tough especially at elevated temperature and does not tend to deform when the two electrically conductive parts to be sealed together are heat sealed at high temperatures and pressures. Furthermore, when heat sealing is used a very strong uniform bond is formed between the heat sealed bonding material and the anodised layer. In addition, anodising is a very cheap method for forming in a mass production process a thin electrically insulating film on a metallic substrate. The anodising can be selective by employing masking techniques such as those employed in the manufacture of printed circuit boards. Thus anodised areas can be formed alongside electrically conductive areas.

Electrochemical cells generally contain substances which are corrosive and can attack the cell casing, connections etc. over a period of time. In particular, chemical or electrochemical attack on the insulator in the seal of the cell is a great practical problem. The anodised aluminium oxide layer of the preferred embodiments of the invention is very resistant to corrosion by the active constituents of the cell, thus prolonging the shelf life and service life of the cell.

The use of a thin anodised layer is also advantageous in that the substrate on which the anodised layer is formed can be folded over, for example during crimping of the edges of the cell casing, so as to enhance the sealing of the cell and to reduce the volume taken up by the cell casing, without any danger of the layer breaking and leading to breakdown in the electrical insulation of the layer. When such folding over is employed, the thickness of the anodised layer should preferably not exceed 10 microns otherwise the anodised layer is rather brittle and may crack on bending. Known methods of sealing electrochemical cells generally cannot be used in conjunction with such folding-over techniques since the insulation layer is too thick and stiff or brittle (e.g. when a glass fibre reinforced thermoplastic bonding material is employed).

The use in the preferred embodiments of an anodised layer formed on one of the electrically conductive parts to be sealed has another advantage during mass production. There is no need to have a separate insulating layer. In particular, when in the embodiment of FIGS. 1, 3 and 5 the anodised layer is pre-coated with the layer of heat sealable material, during the sealing of the electrochemical cell only two components have to be manipulated into the correct position for hermetically sealing the cell. This greatly facilitates mass production and results in a more economical production process.

Although the illustrated embodiments are concerned with lithium/manganese dioxide electrochemical cells, the sealing methods of the present invention may be applied to cells incorporating other electrochemical systems. The main advantages of the sealing methods of the present invention are realised, however, when an aluminium container is compatible with the electrolyte and at least one of the electrode materials. Since an anodised layer formed on an aluminium surface has a high degree of corrosion protection, the hermetic sealing methods of the present invention can be used in a wide range of applications and will therefore promote the use of aluminium for cells employing other electrochemical systems.

In addition, in the composite seal provided by the preferred embodiments a very high proportion of the total seal thickness is metallic, leading to three distinct advantages; first, very little volume and thickness is taken up by the seal, thereby rendering the seal very suitable for thin batteries; second, the thermal coefficients of expansion of the seal components can be closely matched since the anodised layer is typically 10 microns thick and the effective adhesive layer is less than 20 microns thick resulting in the achievement of hermeticity over a wide temperature range and third, rapid heat transfer during the sealing operation promotes rapid heat sealing, which is particularly desirable when volatile liquids are contained in the cell casing.

I claim:

1. An electrochemical cell including at least two electrically conductive parts which are sealed together by an organic polymer adhesive but electrically insulated from each other by a layer comprising aluminium oxide which is formed on a surface of one of the parts.

2. An electrochemical cell according to claim 1, wherein the said one of the parts is composed of aluminium or an aluminium alloy and the aluminium oxide layer is formed by oxidation of the surface of the said one part.

3. An electrochemical cell according to claim 2, wherein the aluminium oxide layer is formed by an anodising process.

4. An electrochemical cell according to claim 1, wherein the layer has a thickness of from 0.1 microns to 25 microns.

5. An electrochemical cell according to claim 1, wherein the said two parts are each connected to a respective electrode of the electrochemical cell.

6. An electrochemical cell according to claim 1, wherein one of the said two parts is a terminal for the cell and is comprised of a laminar member comprising a layer of a first metal which is suitable as an electrical contact and is superposed on a layer of aluminium, the said aluminium oxide layer being formed on the aluminium layer, and the other of the said two parts constituting a container for the electrochemical components of the cell.

7. An electrochemical cell according to claim 1, wherein the organic polymer adhesive is a hot melt adhesive.

8. A method of sealing together electrically conductive parts of an electrochemical cell while retaining the said parts electrically insulated from each other, the method comprising the steps of forming a layer comprising aluminium oxide on a surface of one of the parts and adhering the parts together by an organic polymer adhesive so that the layer electrically insulates the parts from each other.

9. A method according to claim 8, wherein the said one of the parts is composed of aluminium or an aluminium alloy and the aluminium oxide layer is formed by oxidation of the surface of the said one part.

10. A method according to claim 9, wherein the aluminium oxide layer is formed by an anodising process.

11. A method according to claim 8, wherein the layer has a thickness of from 0.1 microns to 25 microns.

12. A method according to claim 8, wherein the said two parts are each connected to a respective electrode of the electrochemical cell.

13. A method according to claim 8, wherein one of the said two parts is a terminal for the cell and is comprised of a laminar member comprising a layer of a first metal which is suitable as an electrical contact and is superposed on a layer of aluminium, the said aluminium oxide layer being formed on the aluminium layer, and the other of the said two parts constituting a container for the electrochemical components of the cell.

14. A method according to claim 8, wherein the organic polymer adhesive is a hot melt adhesive.

* * * * *